(12) United States Patent
Kim et al.

(10) Patent No.: US 11,358,219 B2
(45) Date of Patent: Jun. 14, 2022

(54) PREPARATION METHOD FOR METAL FOAM

(71) Applicant: LG CHEM, LTD., Seoul (KR)

(72) Inventors: So Jin Kim, Daejeon (KR); Dong Woo Yoo, Daejeon (KR); Jin Kyu Lee, Daejeon (KR)

(73) Assignee: LG CHEM, LTD.

( * ) Notice: Subject to any disclaimer, the term of this patent is extended or adjusted under 35 U.S.C. 154(b) by 17 days.

(21) Appl. No.: 16/625,863

(22) PCT Filed: Jul. 6, 2018

(86) PCT No.: PCT/KR2018/007703
§ 371 (c)(1),
(2) Date: Dec. 23, 2019

(87) PCT Pub. No.: WO2019/009668
PCT Pub. Date: Jan. 10, 2019

(65) Prior Publication Data
US 2020/0147692 A1    May 14, 2020

(30) Foreign Application Priority Data

Jul. 6, 2017  (KR) .......................... 10-2017-0086011

(51) Int. Cl.
*B22F 3/11*        (2006.01)
*B22F 1/10*        (2022.01)
(Continued)

(52) U.S. Cl.
CPC .................................... *B22F 3/11* (2013.01);
*B22F 1/10* (2022.01); *B22F 3/1125* (2013.01);
*B22F 5/006* (2013.01);
(Continued)

(58) Field of Classification Search
CPC ......... B22F 3/11; B22F 3/1103; B22F 3/1109;
B22F 3/1115; B22F 3/1118; B22F 3/1121;
(Continued)

(56) References Cited

U.S. PATENT DOCUMENTS 5,846,664 A * 12/1998 Third ..................... B22F 7/002
428/550
6,605,648 B1    8/2003 Johnson et al.
(Continued)

FOREIGN PATENT DOCUMENTS

CN         1802228 A      7/2006
CN       102438778 A      5/2012
(Continued)

OTHER PUBLICATIONS

Japanese Office Action and English translation corresponding to Japanese Patent Application No. 2019-570979, dated Nov. 9, 2020 (15 pages).
(Continued)

*Primary Examiner* — Anthony J Zimmer
*Assistant Examiner* — Dean Mazzola
(74) *Attorney, Agent, or Firm* — Myers Bigel, P.A.

(57) ABSTRACT

Provided herein are methods of preparing a metal foam that include the steps of forming a metal foam precursor with a slurry comprising a metal component, a dispersant, a binder and an antisolvent, and sintering the metal foam precursor. Such methods may provide metal foams having various pore sizes. Methods further include forming a thin metal foam on a base material.

17 Claims, 1 Drawing Sheet

(51) Int. Cl.
  *B22F 7/00* (2006.01)
  *B22F 5/00* (2006.01)
  *B22F 3/105* (2006.01)
(52) U.S. Cl.
  CPC ...... *B22F 7/002* (2013.01); *B22F 2003/1053* (2013.01); *B22F 2301/10* (2013.01)
(58) Field of Classification Search
  CPC ....... B22F 3/1125; B22F 3/1137; B22F 3/114; B22F 3/1143; B22F 3/1146; B22F 3/1131; B22F 7/002; B22F 7/006; B22F 2003/1053; B22F 5/006; B22F 1/0074; B22F 2202/05; B22F 2202/06; B22F 2202/07; B22F 1/0059; B22F 1/0077; B22F 2001/0066; B22F 3/10; B22F 3/105; B22F 3/1112; B22F 3/1134; B22F 2003/1128; B22F 2003/1131; B22F 7/004; B22F 2301/10; B22F 3/115; B22F 2003/1106; B22F 2201/013; B22F 2201/11; F01N 2330/22; B60B 2360/149; B32B 2255/062; B01D 39/2051; C22C 1/0425; C22C 1/08; C22C 2001/081; C22C 2001/082; C22C 2001/083; C22C 2001/085; C22C 2001/086; C22C 2001/087; C22C 2001/088; H01M 4/80; H01M 4/801; H01M 4/808; H01M 4/8605; H01M 4/8885; H01M 2004/021; H01M 8/0232; H01M 8/0239; H01M 8/0241; H01M 8/0243; H01M 8/0245
  See application file for complete search history.

(56) References Cited

U.S. PATENT DOCUMENTS

| | | | | |
|---|---|---|---|---|
| 2007/0044663 | A1* | 3/2007 | Song | B01D 67/0046 96/11 |
| 2009/0232692 | A1* | 9/2009 | Wada | B22F 3/1137 419/2 |
| 2011/0114254 | A1 | 5/2011 | Xu et al. | |
| 2012/0021333 | A1* | 1/2012 | Hwang | B22F 5/006 429/479 |

FOREIGN PATENT DOCUMENTS

| | | |
|---|---|---|
| CN | 104588651 A | 5/2015 |
| CN | 106000123 A | 10/2016 |
| JP | H04187557 A | 7/1992 |
| JP | H05339605 | 12/1993 |
| JP | H0987706 A * | 3/1997 |
| JP | H0987706 A | 3/1997 |
| JP | 2003155503 A * | 5/2003 |
| JP | 2009102701 A * | 9/2005 |
| JP | 2005290493 A | 10/2005 |
| JP | 2005290494 | 10/2005 |
| JP | 2005290494 A * | 10/2005 |
| JP | 2006124833 A | 5/2006 |
| JP | 2009053675 A | 3/2009 |
| JP | 2009102701 | 5/2009 |
| JP | 2011099146 | 5/2011 |
| JP | 2017115204 A | 6/2017 |
| KR | 1020050040714 | 5/2005 |
| KR | 20080078294 A | 8/2008 |
| KR | 101029869 | 4/2011 |
| KR | 101343377 B1 * | 12/2013 |
| KR | 1020140048895 | 4/2014 |
| WO | 2014208690 A1 | 12/2014 |

OTHER PUBLICATIONS

Extended European Search Report corresponding to EP 18827747. 9; dated Jun. 18, 2020 (7 pages).
International Search Report corresponding to PCT/KR2018/ 007703; dated Oct. 1, 2018 (2 pp).
Chinese Office Action corresponding to Chinese Patent Application No. CN201880041470.9, dated Apr. 27, 2021 (17 pages).
Japanese Office Action corresponding to Japanese Patent Application No. 2019-570979, dated Apr. 12, 2021 (7 pages).

* cited by examiner

PREPARATION METHOD FOR METAL FOAM

CROSS REFERENCE TO RELATED APPLICATIONS

This application is a 35 U.S.C. § 371 national stage application of PCT International Application No. PCT/KR2018/007703, filed Jul. 6, 2018, which claims priority from Korean Patent Application No. 10-2017-0086011, filed Jul. 6, 2017, the contents of which are incorporated herein in their entireties by reference. The above-referenced PCT International Application was published in the Korean language as International Publication No. WO 2019/009668 on Jan. 10, 2019.

TECHNICAL FIELD

The present application relates to a method for preparing a metal foam.

BACKGROUND ART

Metal foams are also called various names such as foaming metals and refer to metal structures including a number of pores. These metal foams have various and useful properties such as lightweight properties, energy absorption properties, heat insulation properties, refractory properties or environmental friendliness properties, which can be applied to various fields including a structure, a transportation machine, a building material or an energy absorbing device, and the like, or a heat exchanger, a catalyst, a sensor, an actuator, a secondary battery, a fuel cell, a gas diffusion layer (GDL) or a microfluidic flow controller, and the like.

Conventionally, various methods for producing metal foams are known, but it is a difficult problem to manufacture metal foams having a thin thickness and a desired porosity simultaneously. Particularly, the preparation method for a metal foam having a pore size controlled to the desired level while being thin and having the desired porosity is scarcely known.

DISCLOSURE

Technical Problem

The present application relates to a method for preparing a metal foam. It is one object of the present application to be capable of preparing a metal foam which is thin and has suitable porosity and pore sizes by a simple and efficient process.

Technical Solution

In the present application, the term metal foam or metal skeleton means a porous structure comprising a metal or a metal alloy as a main component. Here, the fact that a metal or the like uses as a main component means that the ratio of the metal or the like is 55 wt % or more, 60 wt % or more, 65 wt % or more, 70 wt % or more, 75 wt % or more, 80 wt % or more, 85 wt % or more, 90 wt % or more, or 95 wt % or more based on the total weight of the metal foam or the metal skeleton. The upper limit of the ratio of the metal or the like contained as the main component is not particularly limited. For example, the ratio of the metal may be 100 wt % or less, or less than about 100 wt %.

The term porous property may mean a case where porosity is at least 30% or more, 40% or more, 50% or more, 60% or more, 70% or more, 75% or more, or 80% or more. The upper limit of the porosity is not particularly limited, and may be, for example, less than about 100%, about 99% or less, or about 98% or less or so. Here, the porosity can be calculated in a known manner by calculating the density of the metal foam or the like.

The method for preparing a metal foam of the present application may comprise a step of sintering a metal foam precursor. In the present application, the term metal foam precursor means a structure before the process performed to form the metal foam, such as sintering, that is, a structure before the metal foam is formed. In addition, even when the metal foam precursor is referred to as a porous metal foam precursor, it is not necessarily porous per se, and may be referred to as a porous metal foam precursor for convenience, if it can finally form a metal foam, which is a porous metal structure.

In the present application, the metal foam precursor may be formed using a slurry containing at least a metal component, a dispersant, an antisolvent, and a binder.

In one example, the antisolvent may be a solvent that does not dissolve the binder while having miscibility with the dispersant. The antisolvent may be an antisolvent against the binder applied to the slurry. The meaning of the term antisolvent is widely known in the art. That is, the antisolvent may mean a solvent in which the binder exhibits a low solubility with respect to the relevant solvent, so that the relevant binder may be precipitated, and the meaning of such an antisolvent is widely known, for example, in application fields or the like such as a so-called antisolvent deposition method. The term antisolvent may be a solvent which may have miscibility with the dispersant in the slurry to be mixed and does not dissolve the binder. For example, if the binder is a polymer, the term antisolvent may be a solvent which may have miscibility with a dispersant to be mixed and does not swell the polymer binder.

The metal foam precursor may be formed using a slurry containing the metal component, the dispersant, the binder and the antisolvent, which may be formed, for example, by coating the slurry on a suitable base material. Also, if necessary, a drying process or the like may be appropriately performed after the process.

The kind of the base material applied upon forming the metal foam precursor is not particularly limited. For example, the base material may be a base material for processing having a release property or the like, which is finally removed after preparing the metal foam. In addition, the metal foam on which the base material is formed may be integrated and applied, and in such a case, as the base material, a metal base material or the like may be applied, where the kind of the base material is not limited.

The metal component included in the slurry may form a metal foam. Therefore, the kind of the metal component can be selected in consideration of physical properties required for the metal foam or process conditions of the sintering step.

Here, as the metal component, metal powder may be applied. An example of the applicable metal powder is determined depending on purposes, which is not particularly limited, but it can be exemplified by any one powder selected from the group consisting of copper powder, molybdenum powder, silver powder, platinum powder, gold powder, aluminum powder, chromium powder, indium powder, tin powder, magnesium powder, phosphorus powder, zinc powder and manganese powder, metal powder mixed with two or more of the foregoing or a powder of an alloy of two or more of the foregoing, without being limited thereto.

If necessary, the metal component may comprise, as an optional component, a metal component having relative magnetic permeability and conductivity in a predetermined range. Such a metal component can be helpful in selecting an induction heating method in a sintering process. However, since the sintering does not necessarily have to proceed by the induction heating method, the metal component having the above magnetic permeability and conductivity is no essential component.

In one example, as the metal powder which can be optionally added, metal powder having relative magnetic permeability of 90 or more may be used. The term relative magnetic permeability ($\mu_r$) is a ratio ($\mu/\mu_o$) of the magnetic permeability ($\mu$) of the relevant material to the magnetic permeability ($\mu_o$) in the vacuum. In another example, the relative magnetic permeability may be 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The upper limit of the relative magnetic permeability is not particularly limited because the higher the value is, the more advantageous it is in the case where the induction heating is applied. In one example, the upper limit of the relative magnetic permeability may be, for example, about 300,000 or less.

The metal powder that can be optionally added may also be conductive metal powder. In the present application, the term conductive metal powder may mean a powder of a metal or an alloy thereof having conductivity at 20° C. of about 8 MS/m or more, 9 MS/m or more, 10 MS/m or more, 11 MS/m or more, 12 MS/m or more, 13 MS/m or more, or 14.5 MS/m. The upper limit of the conductivity is not particularly limited, and for example, may be about 30 MS/m or less, 25 MS/m or less, or 20 MS/m or less.

In the present application, the metal powder having the relative magnetic permeability and conductivity may also be simply referred to as conductive magnetic metal powder.

A specific example of such conductive magnetic metal powder can be exemplified by a powder of nickel, iron or cobalt, and the like, but is not limited thereto.

If used, the ratio of the conductive magnetic metal powder in the entire metal powder is not particularly limited. For example, the ratio may be adjusted so that the ratio may generate appropriate Joule heat upon the induction heating. For example, the metal powder may comprise 30 wt % or more of the conductive magnetic metal powder based on the weight of the entire metal powder. In another example, the ratio of the conductive magnetic metal powder in the metal powder may be about 35 wt % or more, about 40 wt % or more, about 45 wt % or more, about 50 wt % or more, about 55 wt % or more, 60 wt % or more, 65 wt % or more, 70 wt % or more, 75 wt % or more, 80 wt % or more, 85 wt % or more, or 90 wt % or more. The upper limit of the conductive magnetic metal powder ratio is not particularly limited, and may be, for example, less than about 100 wt %, or 95 wt % or less. However, the above ratios are exemplary ratios.

The size of the metal powder is also selected in consideration of the desired porosity or pore size, and the like, but is not particularly limited, where the metal powder may have an average particle diameter, for example, in a range of about 0.1 μm to about 200 μm. In another example, the average particle diameter may be about 0.5 μm or more, about 1 μm or more, about 2 μm or more, about 3 μm or more, about 4 μm or more, about 5 μm or more, about 6 μm or more, about 7 μm or more, or about 8 μm or more. In another example, the average particle diameter may be about 150 μm or less, 100 μm or less, 90 μm or less, 80 μm or less, 70 μm or less, 60 μm or less, 50 μm or less, 40 μm or less, 30 μm or less, or 20 μm or less. As the metal in the metal particles, one having different average particle diameters may also be applied. The average particle diameter can be selected from an appropriate range in consideration of the shape of the desired metal foam, for example, the thickness or porosity of the metal foam, and the like.

Here, the average particle diameter of the metal powder may be obtained by a known particle size analysis method, and for example, the average particle diameter may be a so-called D50 particle diameter.

The ratio of the metal component (metal powder) in the slurry as above is not particularly limited, which may be selected in consideration of the desired viscosity and process efficiency. In one example, the ratio of the metal component in the slurry may be 0.5 10 to 95% or so on the basis of weight, but is not limited thereto. In another example, the ratio may be about 1% or more, about 1.5% or more, about 2% or more, about 2.5% or more, about 3% or more, about 5% or more, 10% or more, 15% or more, 20% or more, 25% or more, 30% or more, 35% or more, 40% or more, 45% or more, 50% or more, 55% or more, 60% or more, 65% or more, 70% or more, 75% or more, or 80% or more, or may be about 90% or less, about 85% or less, about 80% or less, about 75% or less, about 70% or less, about 65% or less, 60% or less, 55% or less, 50% or less, 45% or less, 40% or less, 35% or less, 30% or less, 25% or less, 20% or less, 15% or less, 10% or less, or 5% or less, but is not limited thereto.

As the dispersant contained in the slurry, for example, an alcohol may be applied. As the alcohol, a monohydric alcohol having 1 to 20 carbon atoms such as methanol, ethanol, propanol, pentanol, octanol, pentanol, 2-methoxyethanol, 2-ethoxyethanol, 2-butoxyethanol, glycerol, texanol, or terpineol, or a dihydric alcohol (glycol) having 1 to 20 carbon atoms such as ethylene glycol, propylene glycol, pentane diol, hexane diol or octane diol, or a polyhydric alcohol, etc., may be used, but the kind is not limited to the above.

The suitable dispersant can be exemplified by an alcohol having 9 to 20 carbon atoms, such as texanol, an alcohol having a double bond and/or a cyclic structure while having 9 to 20 carbon atoms, such as terpineol, or a glycol having 1 to 20 carbon atoms, 1 to 16 carbon atoms, 1 to 12 carbon atoms, 1 to 8 carbon atoms or 1 to 4 carbon atoms, such as ethylene glycol or propylene glycol, and the like, but is not limited thereto.

The dispersant may be contained in a ratio of, for example, about 30 to 2,000 parts by weight relative to 100 parts by weight of the binder. In another example, the ratio may be about 50 parts by weight or more, about 100 parts by weight or more, about 150 parts by weight or more, about 200 parts by weight or more, about 300 parts by weight or more, about 400 parts by weight or more, about 500 parts by weight or more, about 550 parts by weight or more, about 600 parts by weight or more, or about 650 parts by weight or more, and may be about 1,800 parts or less, about 1,600 parts by weight or less, about 1,400 parts by weight or less, about 1,200 parts by weight or less, about 1,000 parts by weight or less, or about 900 parts by weight or less.

The slurry may comprise a binder. The binder may improve dispersibility of the metal particles contained in the slurry, so that the process of applying the slurry on the base material may be easily performed, and may serve to support the metal foam precursor in the step of sintering the metal foam precursor. The kind of such a binder is not particularly limited and it can be appropriately selected depending on the kind of the metal particles or the kind of the dispersant, and the like applied upon preparing the slurry. For example, the binder can be exemplified by alkyl cellulose having an alkyl group having 1 to 8 carbon atoms, such as methyl cellulose or ethyl cellulose; polyalkylene carbonate having an alkylene unit having 1 to 8 carbon atoms, such as polyethylene carbonate or polypropylene carbonate; polyvinyl alcohol; or polyvinyl acetate, and the like, but is not limited thereto.

The content of the binder in the slurry is not particularly limited, which may be selected according to porosity required for the metal foam. In one example, the binder may be included in a ratio of about 1 to 500 parts by weight relative to 100 parts by weight of the metal component. In another example, the ratio may be about 2 parts by weight or more, about 3 parts by weight or more, about 4 parts by weight or more, about 5 parts by weight or more, about 6 parts by weight or more, about 7 parts by weight or more, about 8 parts by weight or more, about 9 parts by weight or more, about 10 parts by weight or more, about 20 parts by weight or more, about 30 parts by weight or more, about 40 parts by weight or more, about 50 parts by weight or more, about 60 parts by weight or more, about 70 parts by weight or more, about 80 parts by weight or more, about 90 parts by weight or more, about 100 parts by weight or more, about 110 parts by weight or more, about 120 parts by weight or more, about 130 parts by weight or more, about 140 parts by weight or more, about 150 parts by weight or more, about 200 parts by weight or more, or about 250 parts by weight or more, and may be about 450 parts by weight or less, about 400 parts by weight or less, about 350 parts by weight or less, about 300 parts by weight or less, about 250 parts by weight or less, about 200 parts by weight or less, about 150 parts by weight or less, about 100 parts by weight or less, about 90 parts by weight or less, about 80 parts by weight or less, about 70 parts by weight or less, about 60 parts by weight or less, about 50 parts by weight or less, about 40 parts by weight or less, about 30 parts by weight or less, about 20 parts by weight or less, or about 15 parts by weight or less.

The slurry may comprise an antisolvent. The antisolvent has miscibility with the dispersant, but does not dissolve the binder, thereby serving to increase the size of the pores of the metal foam formed by drying and sintering the slurry. The pore size of the formed metal foam can be controlled by controlling the kinds and contents of the dispersant and the antisolvent. The kind of the antisolvent is not particularly limited as long as it does not dissolve the binder while being miscible with the dispersant. In addition, when the binder is a polymer binder, the kind of the antisolvent is not particularly limited as long as it does not swell the polymer binder while being miscible with the dispersant. For example, as the antisolvent, a monohydric alcohol such as isopropanol, a polyhydric alcohol such as ethylene glycol, diethylene glycol or glycerol, an alkanolamine such as trimethanolamine or triethanolamine, an alkyl ether such as ethyl ether, isopropyl ether or n-butyl ether, an aryl ether such as phenyl ether or benzyl ether, an ester such as sec-amyl acetate, a ketone such as acetone, methyl ethyl ketone or methyl isobutyl ketone, an alkylbenzene such as isopropylbenzene or diethylbenzene, an arylbenzene such as diphenylbenzene, and a halobenzene such as trichlorobenzene, and the like can be used, but the kind is not limited thereto. The suitable antisolvent is exemplified by an aliphatic alcohol having 1 to 20 carbon atoms, 1 to 16 carbon atoms, 1 to 12 carbon atoms, 1 to 8 carbon atoms or 1 to 4 carbon atoms, such as isopropanol, but is not limited thereto.

The content of the antisolvent in the slurry is not particularly limited, which may be selected depending on the desired pore size. The antisolvent may be included in a ratio of, for example, about 0.5 to 2,000 parts by weight relative to 100 parts by weight of the binder. In another example, the ratio may be about 1 part by weight or more, about 1.5 parts by weight or more, about 2 parts by weight or more, about 3 parts by weight or more, about 4 parts by weight or more, about 5 parts by weight or more, about 6 parts by weight or more, about 7 parts by weight or more, about 8 parts by weight or more, about 9 parts by weight or more, about 10 parts by weight or more, about 15 parts by weight or more, about 20 parts by weight or more, about 25 parts by weight or more, about 30 parts by weight or more, about 35 parts by weight or more, about 40 parts by weight or more, about 45 parts by weight or more, about 50 parts by weight or more, about 55 parts by weight or more, about 60 parts by weight or more, about 65 parts by weight or more, about 70 parts by weight or more, about 75 parts by weight or more, about 80 parts by weight or more, about 85 parts by weight or more, about 90 parts by weight or more, about 95 parts by weight or more, about 100 parts by weight or more, about 110 parts by weight or more, about 120 parts by weight or more, about 130 parts by weight or more, about 140 parts by weight or more, about 150 parts by weight or more, about 160 parts by weight or more, about 170 parts by weight or more, about 180 parts by weight or more, about 190 parts by weight or more, about 200 parts by weight or more, about 300 parts by weight or more, about 400 parts by weight or more, about 500 parts by weight or more, about 550 parts by weight or more, about 600 parts by weight or more, or about 650 parts by weight or more, and may be about 1,800 parts by weight or less, about 1,600 parts by weight or less, about 1,400 parts by weight or less, about 1,200 parts by weight or less, about 1,000 parts by weight or less, about 900 parts by weight or less, about 850 parts by weight or less, about 800 parts by weight or less, about 750 parts by weight or less, about 700 parts by weight or less, about 650 parts by weight or less, about 600 parts by weight or less, about 550 parts by weight or less, about 500 parts by weight or less, about 450 parts by weight or less, about 400 parts by weight or less, about 350 parts by weight or less, or about 300 parts by weight or less.

In the slurry, for example, the sum of the weight of the dispersant and the antisolvent may be 10 parts by weight to 1,000 parts by weight relative to 100 parts by weight of the metal component. In another example, the ratio may be about 20 parts by weight or more, 30 parts by weight or more, 40 parts by weight or more, about 50 parts by weight or more, about 60 parts by weight or more, about 70 parts by weight or more, about 80 parts by weight or more, or about 85 parts by weight, and may be about 800 parts by weight or less, about 700 parts by weight or less, 600 parts by weight or less, about 500 parts by weight or less, 400 parts by weight or less, about 300 parts by weight or less, about 200 parts by weight or less, about 150 parts by weight or less, about 100 parts by weight or less, or about 95 parts by weight or less.

In the slurry, for example, the ratio (AB) of the weight (A) of the dispersant to the weight (B) of the antisolvent may be in a range of about 0.5 to 20 or so. In another example, the ratio may be about 1 or more, 1.5 or more, or 2 or more, or may be about 18 or less, about 16 or less, about 14 or less, about 12 or less, or about 10 or less or so.

The slurry may or may not further comprise a solvent, if necessary. In one example, the slurry may not comprise a solvent, in order to achieve the desired level of porosity and freedom degree of pore size control. At this time, the range of the solvent which is not included excludes the dispersant and the antisolvent. That is, in one example, the slurry may not comprise a solvent except for the dispersant and the antisolvent. As the solvent, an appropriate solvent may be used in consideration of solubility of the components in the slurry, for example, the metal particles or the binder, and the like. For example, as the solvent, one having a dielectric constant in a range of about 10 to 120 can be used. In another example, the dielectric constant may be about 20 or more, about 30 or more, about 40 or more, about 50 or more, about 60 or more, or about 70 or more, or may be about 110 or less, about 100 or less, or about 90 or less. Such a solvent can be exemplified by water, an alcohol having 1 to 8 carbon atoms such as ethanol, butanol or methanol, DMSO (dimethyl sulfoxide), DMF (dimethyl formamide) or NMP (N-methylpyrrolidinone), and the like, but is not limited thereto.

When a solvent is applied, it may be present in the slurry in a ratio of about 50 to 400 parts by weight relative to 100 parts by weight of the binder, but is not limited thereto.

The slurry may also comprise, in addition to the above-mentioned components, known additives which are additionally required.

The method of performing a step of forming the metal foam precursor using the slurry as above is not particularly limited, and its procedure may comprise known steps such as a step of drying the applied slurry. In the production field of metal foams, various methods for forming metal foam precursors using slurries are known, and in the present application, all of these methods can be applied. In one example, the drying step of forming a metal foam precursor may be a step of heat-treating s slurry applied on s base material at a temperature of 20° C. ° C. to 250° C., 50° C. to 180° C. or 70° C. to 150° C. Through the drying step, a metal foam precursor including a porous structure formed on a base material can be formed.

In one example, the metal foam precursor may also be formed in a film or sheet shape.

The metal foam precursor may have a thickness of 500 µm or less, 400 µm or less, 300 µm or less, 200 µm or less, 150 µm or less, about 100 µm or less, about 90 µm or less, about 80 µm or less, about 70 µm or less, about 60 µm or less, or about 55 µm or less. Here, the lower limit of the thickness of the porous structure is not particularly limited. For example, the thickness of the porous structure may be about 5 µm or more, 10 µm or more, or about 15 µm or more.

The metal foam can be produced through the step of sintering the metal foam precursor formed in this manner. In this case, a method of performing the sintering for forming the metal foam is not particularly limited, where a known sintering method can be applied. That is, the sintering step may be performed by a method of applying an appropriate amount of heat to the metal foam precursor in an appropriate manner, and for example, the sintering step may be performed by a method of applying an external heat source at 500° C. to 2000° C., 700° C. to 1500° C. or 800° C. to 1200° C. thereto.

In the present application, the sintering can be performed by an induction heating method as a method different from the existing known method. The induction heating method means that sintering is performed using heat generated by applying an electromagnetic field to a metal foam precursor. By this method, it is possible to produce metal foams having excellent mechanical properties and porosity controlled to the desired level while including uniformly formed pores.

Here, the induction heating is a phenomenon in which heat is generated in a specific metal when an electromagnetic field is applied. For example, when an electromagnetic field is applied to a metal having proper conductivity and magnetic permeability, eddy currents are generated in the metal and Joule heat occurs due to the resistance of the metal. In the present application, a sintering process can be performed through such a phenomenon. In the present application, the sintering of the metal foam can be performed in a short time by applying such a method, thereby ensuring the processability and simultaneously preparing metal foams having excellent mechanical strength while being in the form of a thin film with high porosity.

In order to proceed with the sintering by the induction heating method, the metal component included in the slurry may comprise the conductive metal or the conductive magnetic metal having appropriate relative magnetic permeability and conductivity.

When the sintering step is performed by induction heating, the conditions for applying an electromagnetic field are determined depending on the kind and ratio of the conductive magnetic metal in the metal foam precursor, which are not particularly limited. For example, the induction heating can be performed using an induction heater formed in the form of a coil or the like. The induction heating can be performed by applying a current of, for example, about 100 A to 1,000 A or so. In another example, the magnitude of the applied current may be 900 A or less, 800 A or less, 700 A or less, 600 A or less, 500 A or less, or 400 A or less. In another example, the magnitude of the current may be about 150 A or more, about 200 A or more, or about 250 A or more.

The induction heating can be performed, for example, at a frequency of about 100 kHz to 1,000 kHz. In another example, the frequency may be 900 kHz or less, 800 kHz or less, 700 kHz or less, 600 kHz or less, 500 kHz or less, or 450 kHz or less. In another example, the frequency may be about 150 kHz or more, about 200 kHz or more, or about 250 kHz or more.

The application of the electromagnetic field for the induction heating can be performed in a range of, for example, about 1 minute to 10 hours. In another example, the application time may be about 10 minutes or more, about 20 minutes or more, or about 30 minutes or more. In another example, the application time may be about 9 hours or less, about 8 hours or less, about 7 hours or less, about 6 hours or less, about 5 hours or less, about 4 hours or less, about 3 hours or less, about 2 hours or less, about 1 hour or less, or about 30 minutes or less.

The above-mentioned induction heating conditions, for example, the applied current, the frequency and the application time, and the like may be changed in consideration of the kind and the ratio of the conductive magnetic metal particles, as described above.

The sintering step may be performed only by the above-mentioned induction heating, or may also be performed with applying appropriate heat together with the induction heating, that is, application of an electromagnetic field. For example, the sintering step may also be performed by applying an external heat source to the metal foam precursor alone or together with the application of the electromagnetic field.

The method for preparing a metal foam of the present invention can provide metal foams having various pore sizes. By controlling the content of the antisolvent contained in the slurry, the pore size of the metal foam formed by the sintering step can be easily controlled. In one example, the pore size of the metal foam produced by the method for preparing a metal foam of the present invention may be in a range of 0.1 μm to 200 μm. In another example, the pore size may be about 0.5 μm or more, about 1 μm or more, about 2 μm or more, about 3 μm or more, about 4 μm or more, about 5 μm or more, about 6 μm or more, about 7 μm or more, or about 8 μm or more. In another example, the pore size may be about 150 μm or less, 100 μm or less, 90 μm or less, 80 μm or less, 70 μm or less, 60 μm or less, 50 μm or less, 40 μm or less, 30 μm or less or 20 μm or less.

The formed metal foam may have porosity in a range of about 30% to 99% or 30% to 90%. As mentioned above, according to the method of the present invention, the metal foam can comprise uniformly formed pores, and the pore size, porosity and mechanical strength of the metal foam can be controlled. The porosity may be 50% or more, 60% or more, 70% or more, 75% or more, or 80% or more, or may be 95% or less, 90% or less, about 85% or less, or about 80% or less.

The method for preparing a metal foam of the present application can form a thin metal foam on a base material. The metal foam may be formed in the form of a film or sheet. In one example, the thickness of the metal foam is not particularly limited, but may be 500 μm or less, 400 μm or less, 300 μm or less, 200 μm or less, 150 μm or less, about 100 μm or less, about 90 μm or less, about 80 μm or less, about 70 μm or less, about 60 μm or less, or about 55 μm or less. Here, the lower limit of the thickness of the metal foam is not particularly limited. For example, the thickness of the metal foams may be about 5 μm or more, 10 μm or more, or about 15 μm or more.

Advantageous Effects

The present application relates to a method for preparing a metal foam. The present application can provide a method capable of preparing a metal foam which is thin and has suitable porosity and pore sizes by a simple and efficient process.

MODE FOR INVENTION

Hereinafter, the present application will be described by way of Examples and Comparative Examples, but the scope of the present application is not limited to the following Examples.

EXAMPLE 1

Figure 1:
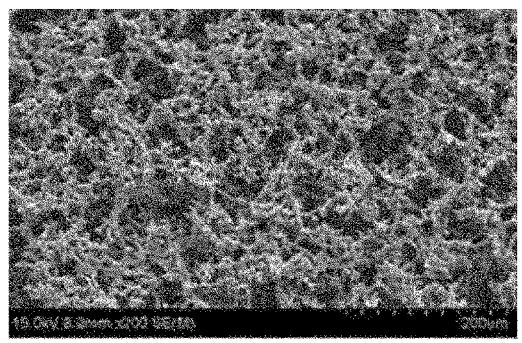
FIG. 1 is a scanning electron micrograph of the metal foam prepared in Example 1.

Copper powder having an average particle diameter (D50) in a range of about 10 to 20 μm, a binder (polyvinyl acetate), a dispersant (alpha-terpineol) and an antisolvent (isopropanol) were combined in a weight ratio of about 5:0.5:4.05:0.45 (copper powder: binder: dispersant: antisolvent) to prepare a slurry. The slurry was coated in a film form and dried at about 100° C. for about 2 hours to form a metal foam precursor. At this time, the thickness of the coated metal foam precursor was about 200 μm or so. An external heat source was applied in an electric furnace so that the precursor was maintained at a temperature of about 900° C. for 2 hours in a hydrogen/argon gas atmosphere, and sintering was performed to prepare a copper foam. The porosity of the prepared copper foam in the form of a sheet was a level of about 76% or so. FIG. 1 is a photograph of the metal foam formed in Example 1.

EXAMPLE 2

Copper powder having an average particle diameter (D50) in a range of about 10 to 20 μm, a binder (polyvinyl acetate), a dispersant (alpha-terpineol) and an antisolvent (isopropanol) were combined in a weight ratio of about 5:0.5:3.15:1.35 (copper powder: binder: dispersant: antisolvent) to prepare a slurry. The slurry was coated in a film form and dried at about 100° C. for about 2 hours to form a metal foam precursor. At this time, the thickness of the coated metal foam precursor was about 200 μm or so. An external heat source was applied in an electric furnace so that the precursor was maintained at a temperature of about 900° C. for 2 hours in a hydrogen/argon gas atmosphere, and sintering was performed to prepare a copper foam. The porosity of the prepared copper foam in the form of a sheet was a level of about 78% or so.

Comparative Example 1

Figure 2:
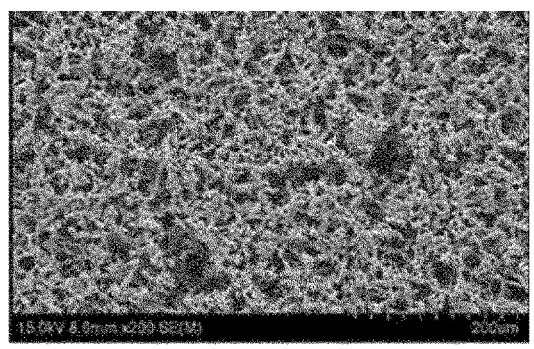
FIG. 2 is a scanning electron micrograph of the metal foam prepared in Comparative Example 1.

Copper powder having an average particle diameter (D50) in a range of about 10 to 20 μm, a binder (polyvinyl acetate) and a dispersant (alpha-terpineol) were combined in a weight ratio of about 5:0.5:4.5 (copper powder: binder: dispersant) to prepare a slurry. The slurry was coated in a film form and dried at about 100° C. for about 2 hours to form a metal foam precursor. At this time, the thickness of the coated metal foam precursor was about 200 μm or so. An external heat source was applied in an electric furnace so that the precursor was maintained at a temperature of about 900° C. for 2 hours in a hydrogen/argon gas atmosphere, and sintering was performed to prepare a copper foam. The porosity of the prepared copper foam in the form of a sheet was a level of about 74% or so. FIG. 2 is a photograph of the prepared metal foam.

Figure 3:
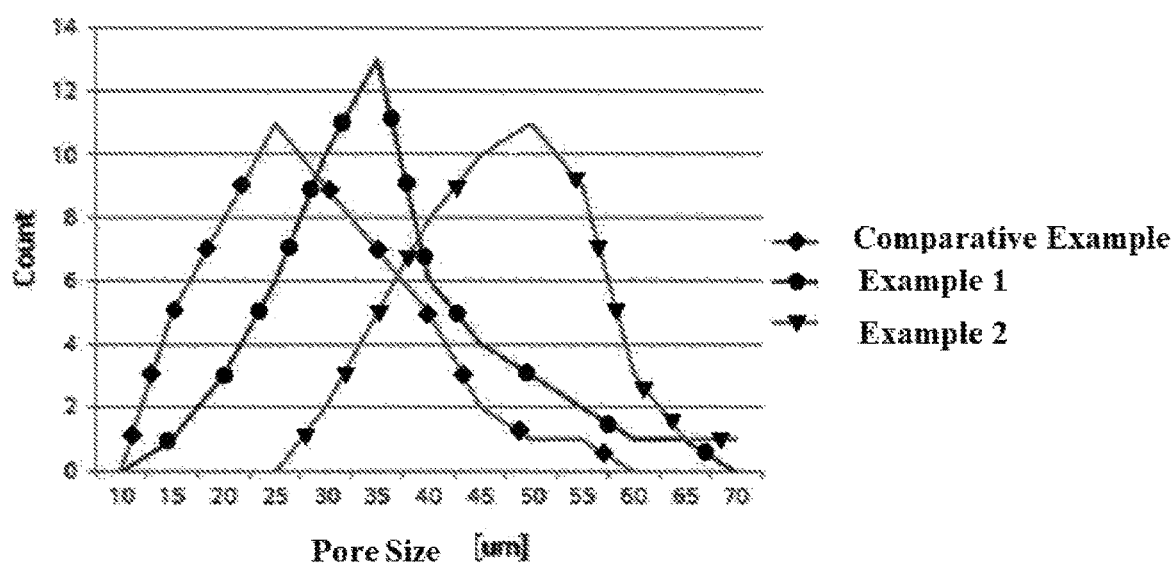
FIG. 3 is a view showing pore size distributions of the metal foams prepared in Examples and Comparative Example.

From the comparison of FIGS. 1 and 2, it can be confirmed that the pore size of the metal foam has been increased even under similar levels of porosity through the application of the antisolvent. FIG. 3 is pore size distributions of the metal foams of Examples 1 and 2 and Comparative Example 1, where it can be confirmed that the pore size of the metal foam can be controlled even under similar levels of porosity by using the antisolvent and also adjusting the amount thereof.

What is claimed is:
1. A method for preparing a metal foam, the method comprising:
   forming a metal foam precursor with a slurry that comprises a metal powder, a dispersant, a binder and an antisolvent for the binder, wherein the antisolvent for the binder is miscible with the dispersant, and a weight ratio of the dispersant and the antisolvent (dispersant/antisolvent) is in a range of 0.5 to 20; and sintering the metal foam precursor, wherein the dispersant is an alcohol having 9 to 20 carbon atoms, wherein the antisolvent is one or more antisolvents selected from the group consisting of a monovalent aliphatic alcohol having 1 to 8 carbon atom(s), an alkanolamine, an alkyl ether, an aryl ether, an ester, a ketone, an alkylbenzene, an arylbenzene, and a halobenzene.

2. The method for preparing the metal foam according to claim 1, wherein the slurry comprises 45 wt % or more of the metal powder.

3. The method for preparing the metal foam according to claim 1, wherein the binder is alkyl cellulose, polyalkylene carbonate, polyvinyl alcohol or polyvinyl acetate.

4. The method for preparing the metal foam according to claim 1, wherein the slurry comprises the binder in a range of 1 to 500 parts by weight relative to 100 parts by weight of the metal powder.

5. The method for preparing the metal foam according to claim 2, wherein the slurry comprises the dispersant in a range of 30 to 2,000 parts by weight relative to 100 parts by weight of the binder.

6. The method for preparing the metal foam according to claim 2, wherein the slurry comprises the antisolvent for the binder in a range of 50 to 500 parts by weight relative to 100 parts by weight of the binder.

7. The method for preparing the metal foam according to claim 1, wherein the dispersant and the antisolvent for the binder are present in the slurry at a total weight in a range of 10 to 1,000 parts by weight relative to 100 parts by weight of the metal powder.

8. The method for preparing the metal foam according to claim 1, wherein the metal foam comprises one or more pores, and wherein the one or more pores have a size in a range of 0.1 μm to 200 μm.

9. The method for preparing the metal foam according to claim 1, wherein a porosity of the metal foam is in a range of 30% to 90%.

10. The method for preparing the metal foam according to claim 1, wherein the metal foam is in the form of a film or sheet.

11. The method for preparing the metal foam according to claim 10, wherein the film or sheet has a thickness of 500 μm or less.

12. The method for preparing the metal foam according to claim 1, wherein forming the metal foam precursor further comprises drying the slurry before sintering the metal foam precursor.

13. The method for preparing the metal foam according to claim 12, wherein drying the slurry is performed at a temperature in a range of 20° C. to 250° C.

14. The method for preparing the metal foam according to claim 1, wherein sintering is performed in an atmosphere including hydrogen and argon.

15. The method for preparing the metal foam according to claim 1, wherein the metal powder comprises copper powder.

16. The method for preparing the metal foam according to claim 1, wherein sintering is performed by induction heating.

17. The method for preparing the metal foam according to claim 1, wherein the slurry comprises the binder in a range of 1 to 20 parts by weight relative to 100 parts by weight of the metal powder; and the dispersant in a range of 500 to 1,500 parts by weight relative to 100 parts by weight of the binder.

* * * * *